April 30, 1929.                J. E. DUDLEY, JR                 1,710,683
                             APHIS REMOVING MACHINE
                    Filed Feb. 27, 1928          2 Sheets-Sheet 1

INVENTOR.
John E. Dudley, Jr.
BY
Morsell, Keeney & Morsell,
ATTORNEYS.

April 30, 1929.  J. E. DUDLEY, JR  1,710,683
APHIS REMOVING MACHINE
Filed Feb. 27, 1928   2 Sheets-Sheet 2

INVENTOR.
John E. Dudley, Jr.
BY Morsell, Keeney & Morsell,
ATTORNEYS.

Patented Apr. 30, 1929.

1,710,683

UNITED STATES PATENT OFFICE.

JOHN E. DUDLEY, JR., OF MADISON, WISCONSIN, ASSIGNOR OF ONE-HALF TO EDWARD M. SEARLS, OF MADISON, WISCONSIN.

APHIS-REMOVING MACHINE.

Application filed February 27, 1928. Serial No. 257,521.

This invention relates to improvements in aphis removing machines.

The aphis and other like insects do a great amount of damage, and are responsible for heavy losses to the growers of canning, table and seed peas, alfalfa and some of the clovers. The aphis has two peculiarities which make it especially susceptible to being collected: First, it tends to congregate on the upper part of the vine, near the tender, succulent and fast growing head; second, it readily falls from the vine when the vine is touched or shaken. The aphis attacks peas when they are from six to ten inches high, according to the season, and generally continues its injury until the peas are harvested.

It is one of the objects of the present invention to provide a machine which will remove the aphis from the plants and collect them in a container carried by the machine.

A further object of the invention is to provide an aphis removing machine constructed to remove the aphis and other injurious insects from the plants without injury thereto, and without destroying the natural enemies of the aphis.

A further object of the invention is to provide an aphis removing machine having means for adjusting the working portion of the machine to operate on crops of different height, and also to permit bodily raising the working portion of the machine, without tilting, in passing small stones or mounds of earth.

A further object of the invention is to provide an aphis removing machine in which the aphis receiving container and the operating mechanism are connected to the frame by a parallelogram construction, which permits maintaining the container in a predetermined plane in all positions of adjustment.

A further object of the invention is to provide an aphis removing machine in which the weight of the operator counterbalances the weight of the forward portion of the machine.

A further object of the invention is to provide an aphis removing machine in which the animal drawing the machine travels directly in front of one of the supporting wheels of the machine to avoid stepping on plants from which the aphides has not yet been removed.

A further object of the invention is to provide an aphis removing machine which is of simple construction, is strong and durable and is very efficient in operation, and is well adapted for the purpose described.

With the above and other objects in view, the invention consists of the improved aphis removing machine and its parts and combinations as set forth in the claims, and all equivalents thereof.

In the accompanying drawings, in which the same reference characters indicate the same parts in all of the views.

Figure 1:
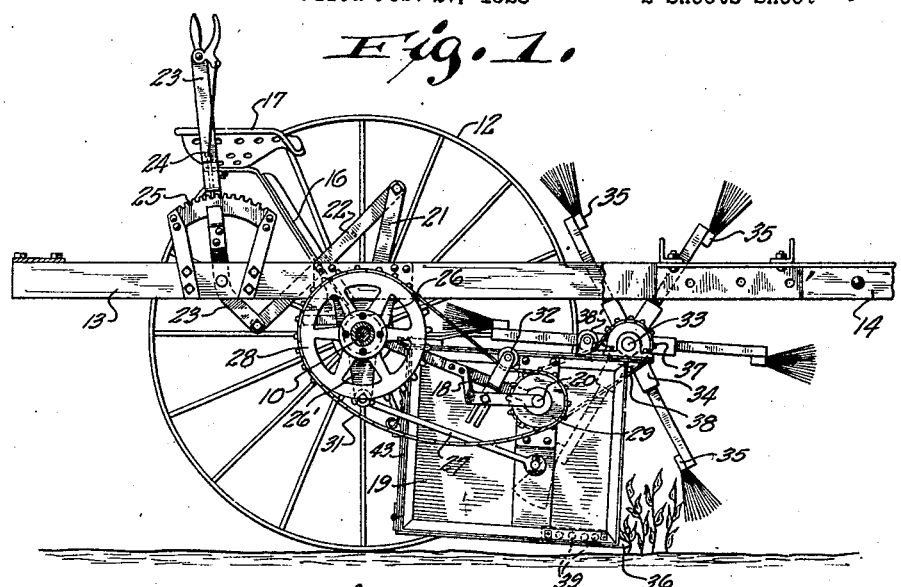
Fig. 1 is a vertical sectional view of the improved aphis removing machine taken on line 1—1 of Fig. 2.
Figure 2:
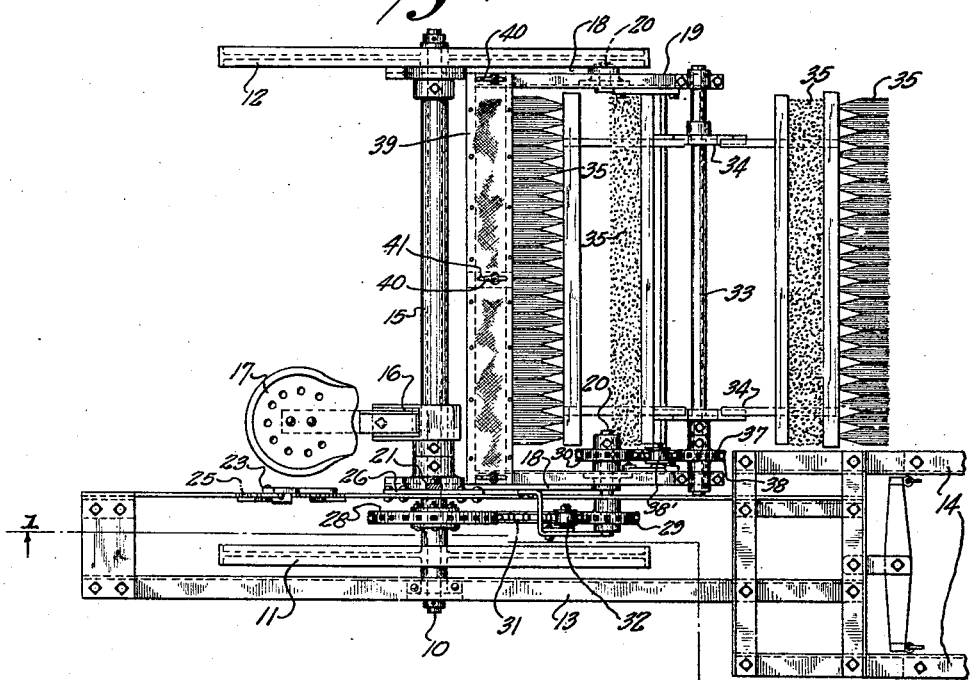
Fig. 2 is a top view thereof.
Figure 3:
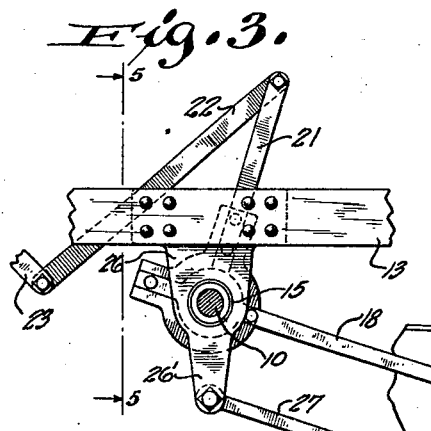
Fig. 3 is a detail view of the means for raising and lowering the container from the ground.
Figure 4:
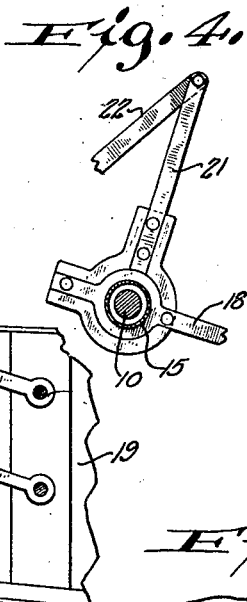
Fig. 4 is a sectional detail view of parts shown in Fig. 3.
Figure 5:
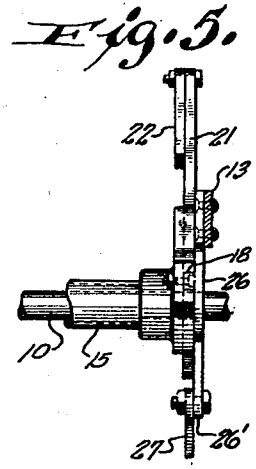
Fig. 5 is a vertical sectional view taken on line 5—5 of Fig. 3.
Figure 6:
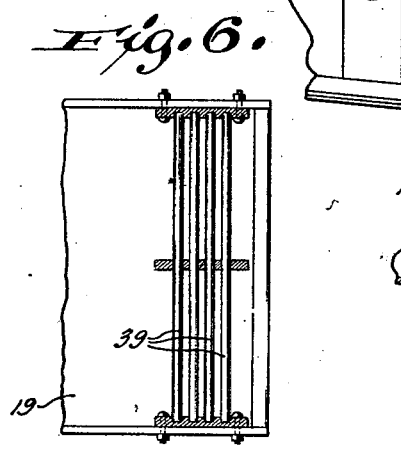
Fig. 6 is a fragmentary view of the front portion of the container.
Figure 7:
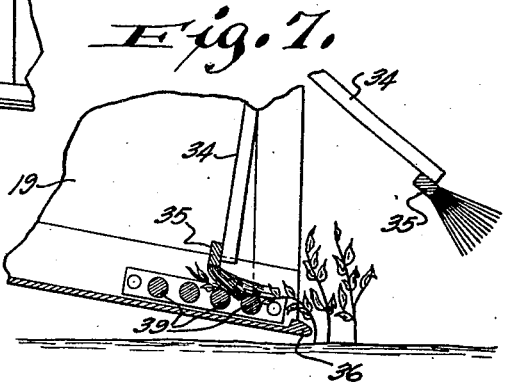
Fig. 7 is a vertical sectional detail view of the parts shown in Fig. 6.
Figure 8:
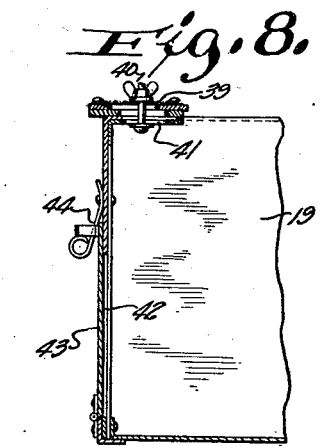
Fig. 8 is a vertical sectional detail view of the rear portion of the container.
Figure 9:
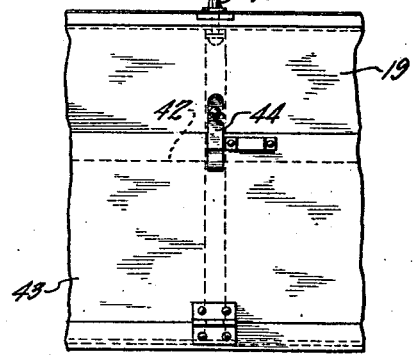
Fig. 9 is a rear view of a fragmentary portion of the container.

Referring to the drawings, the numeral 10 indicates a shaft or axle upon which is journaled supporting wheels 11 and 12. A horizontal frame 13 is connected to and supported from the axle, and to the front portion of this frame forward of the right wheel, shafts 14 are rigidly connected. A tubular member 15 surrounds and is rigidly connected to the shaft 10, and forms part of the frame 13, and the wheels 11 and 12 are loosely journaled on the shaft parts at the opposite end portions of the tubular member. An arm 16 secured to the tubular member 15 extends upwardly and rearwardly therefrom, and is provided with a seat 17, so that the weight of the driver will almost counterbalance the forward portion of the machine. Two arms 18 which are rigidly connected to the opposite end portions of the tubular member 15, and project forwardly therefrom, are pivotally connected to the opposite side portions of a container or hopper 19 by pivot shafts 20. An arm 21 rigidly connected to the tubular member 15 at one end portion, and extending upwardly therefrom, is pivotally connected at its upper end to a link 22, which in turn is pivotally connected at its lower end to a controlling lever 23. The lever 23 carries a spring actuated dog 24 which engages the teeth of a segmental rack 25 for holding the parts in adjusted position. The arm 21 extends at right angles to the arms 18, and as they are all rigidly connected together, they form in substance a bell crank lever connection between the link and the hopper.

The frame 13 is provided with a depending bracket 26 though which the shaft or axle 10 extends, and said bracket is formed with a downward extension 26' to which one end of a parallelogram link 27 is pivotally connected. The opposite end of this link 27 is pivotally connected to one side portion of the hopper 19 below the pivot pin 20, and forms, in conjunction with the arm 18, a parallelogram connection between the frame and the hopper, so that when the lever 23 is pushed forwardly, the hopper will be raised without changing its angularity.

The right hand end portion of the shaft 10 has journaled thereon a sprocket wheel 28 which is connected to and turns with the right hand wheel 11. Sprocket wheels 29 and 30 are also mounted on the outer and inner end portions of the right hand pivot shaft 20, and a sprocket chain 31 connects the sprocket wheels 28 and 29 drivingly together. A chain tightener 32 in the form of an idle pulley bears on the chain 31 to take up slack. A shaft 33 journaled on the upper forward portion of the hopper 19 carries opposite spiders 34 to which a series of spaced transversely extending brushes 35 are connected, and are adapted to sweep inwardly and over the forward edge 36 of the hopper. A sprocket wheel 37 mounted on the brush shaft 33 has a sprocket chain connection 38 with and is driven by the sprocket wheel 30 on the shaft 20. An idler pulley 38' prevents slack in said chain 38.

The brushes are formed of comparatively long bristles or other material which will not injure the plants brushed. The forward portion of the hopper is provided with transverse rods 39 against which the plants are pressed in brushing the upper side portions thereof. The axis of the brush is positioned in a vertical plane to the rear of the lower forward edge of the hopper, so that the brush will press the lower sides of the plants against said edge and the transverse rods during the brushing operation. As the machine is traveling during the brushing operation, the lower side portions of the plants will rub against the rods 39 and the aphides and other insects will be scraped from the lower surfaces of the plants and drop into the hopper beneath the rods. At the same time, the brushes will brush the insects from the upper surfaces of the plants into the hopper. The forward edge 36 of the hopper is of rounded formation to prevent injury to the plants. The position of the brush and its rotation tends to brush the insects towards the rear portion of the hopper, so that said hopper will hold a large mass of the insects before it will have to be emptied. The front and the forward part of the upper portion of the hopper are open to permit the brush member to rotate therein, while the upper rear portion is covered by a screen frame 39 to permit the upward flow of the air moved by the brush and prevent the insects being carried therewith. Said screen frame is adjustably connected to the hopper by bolts and thumb nuts 40 which extend through slotted portions 41 of the screen frame and hopper 19. As thus arranged, the screen frame may be adjusted so that its forward edge will just clear the ends of the bristles of the brush, or so that the brushes will brush against the edge to scrape or shake off the insects therefrom and into the hopper. The rear portion of the hopper is formed with a discharge opening 42 closed by a hinged door 43 held in closed position by a latch 44, and through which opening the insects are discharged.

In use, it is only necessary to drive over the field covered with the plants, and the movement of the vehicle will rotate the brush members and bend the plants over the forward edge of the hopper and the transverse rods. The rotary movement of the brush member and the forward movement of the hopper will brush and scrape the upper and lower side portions of the plants and remove the insects therefrom into the hopper. When the bottom portion of the hopper is covered several inches deep with the insects, the temperature of the struggling mass will increase twenty to forty degrees, and the aphides will be destroyed by the heat engendered, and the mass may be dumped upon the ground.

From the foregoing description, it will be seen that the aphis removing machine is of very simple construction and is well adapted for the purpose described.

What I claim as my invention is:

1. An insect removing machine, comprising a frame, wheels upon which said frame is mounted, a hopper having a parallelogram pivotal connection with the frame, and provided with a lower forward edge forming the lower part of the opening to said hopper, spaced transverse bars mounted in the lower portion of the hopper adjacent its forward edge and spaced from the bottom portion of said hopper, means mounted on the frame and connected to the parallelogram connection for adjusting the height of said hopper without changing its angle, a rotary brush journaled on the hopper and engaging the lower forward edge of the hopper and the transverse bars, and a driving connection between one of the wheels and the rotary brush.

2. An insect removing machine, comprising a frame, wheels upon which said frame is mounted, a hopper having a parallelogram pivotal connection with the frame and provided with a lower forward edge forming the lower part of the opening to said hopper, spaced transverse bars mounted in the lower portion of the hopper adjacent its forward edge and spaced from the bottom portion of said hopper, means mounted on the frame and connected to the parallelogram connection for adjusting the height of said hopper without changing its angle, a rotary brush journaled on the hopper and engaging the lower forward edge of the hopper and the transverse bars, the axis of said brush being in a vertical plane to the rear of the forward edge of the hopper so that said brush will engage said forward edge and the transverse bars, and a driving connection between one of the wheels and the rotary brush.

3. An insect removing machine, comprising a frame, a shaft connected thereto, supporting wheels journaled on the shaft, arms connected to the shaft and projecting forwardly therefrom, a hopper pivotally connected to the forward ends of the arms and provided with a lower forward edge forming the lower part of the opening to said hopper, spaced transverse bars mounted in the lower portion of the hopper adjacent its forward edge and spaced from the bottom portion of said hopper, a link spaced in parallel relation to one of the forwardly projecting arms and pivotally connected to a frame part and to the hopper, an upwardly extending arm connected to the shaft, an operating lever pivotally connected to the frame and having a link connection with the upwardly extending arm for adjusting the height of the hopper without changing its angle, a rotary brush member journaled on the upper forward edge portion of the hopper and engaging the transverse bars, and a driving connection between the brush and one of the wheels.

4. An insect removing machine, comprising a frame, a shaft connected thereto, supporting wheels journaled on the shaft, arms connected to the shaft and projecting forwardly therefrom, a hopper pivotally connected to the forward ends of the arms and provided with a lower forward edge forming the lower part of the opening to said hopper, spaced transverse bars mounted in the lower portion of the hopper adjacent its forward edge and spaced from the bottom portion of said hopper, a link spaced in parallel relation to one of the forwardly projecting arms and pivotally connected to a frame part and to the hopper, an upwardly extending arm connected to the shaft, an operating lever pivotally connected to the frame and having a link connection with the upwardly extending arm for adjusting the height of the hopper without changing its angle, a rotary brush member journaled on the upper forward edge portion of the hopper and engaging the transverse bars, a screen member extending transversely of the upper rear portion of the hopper, and a driving connection between the brush and one of the wheels.

5. An insect removing machine, comprising a frame, a shaft connected thereto, supporting wheels journaled on the shaft, arms connected to the shaft and projecting forwardly therefrom, a hopper pivotally connected to the forward ends of the arms and provided with a lower forward edge forming the lower part of the opening to said hopper, spaced transverse bars mounted in the lower portion of the hopper adjacent its forward edge and spaced from the bottom portion of said hopper, a link spaced in parallel relation to one of the forwardly projecting arms and pivotally connected to a frame part and to the hopper, an upwardly extending arm connected to the shaft, an operating lever pivotally connected to the frame and having a link connection with the upwardly extending arm for adjusting the height of the hopper without changing its angle, a rotary brush member journaled on the upper forward edge portion of the hopper and engaging the transverse bars, a screen member extending transversely of the upper rear portion of the hopper and adjustable forwardly thereon to be engaged by the rotary brush member, and a driving connection between the brush and one of the wheels.

6. An insect removing machine, comprising a frame, a shaft connected thereto, supporting wheels journaled on the shaft, a tubular member surrounding the shaft, a seat extending rearwardly of the tubular member, arms connected to the tubular member and extending forwardly therefrom, a hopper pivotally connected to the forward ends of the arms and provided with a lower forward edge forming the lower part of the opening to said hopper, spaced transverse bars mounted in the lower portion of the hopper adjacent its forward edge and spaced from the bottom, a link spaced in parallel relation to one of the forwardly projecting arms and pivotally connected to a frame part and to the hopper, an upwardly extending arm rigidly connected to the tubular member, an operating lever pivotally connected to the frame and having a link connection with the upwardly extending arm for adjusting the height of the hopper without changing its angle, a shaft journaled on the upper forward portion of the hopper and having spaced spiders, transversely extending brushes connected to said spiders, a sprocket chain and wheel connection between the spider shaft and one of the supporting wheels, said brushes engaging plants and swinging them over the lower forward edge of the hopper and against the transverse bars to brush and scrape insects from the plants into the hopper, said hopper having a discharge opening closed by a door in its rear portion, and a screen member mounted on the upper rear portion of the hopper and engaged by the brushes.

In testimony whereof, I affix my signature.

JOHN E. DUDLEY, Jr.